United States Patent
Botton-Dascal et al.

(10) Patent No.: US 7,688,741 B2
(45) Date of Patent: Mar. 30, 2010

(54) ANALYSIS OF NETWORK PERFORMANCE

(75) Inventors: Shlomit Botton-Dascal, Haifa (IL); Benny Rachlevski-Reich, Haifa (IL); Yair Harel, Moshav Yaad (IL); Moshe Sidi, Haifa (IL); Israel Cidon, Haifa (IL)

(73) Assignee: Cisco Technology, Inc., San Jose, CA (US)

( * ) Notice: Subject to any disclaimer, the term of this patent is extended or adjusted under 35 U.S.C. 154(b) by 1115 days.

(21) Appl. No.: 11/264,480

(22) Filed: Oct. 31, 2005

(65) Prior Publication Data

US 2006/0050649 A1  Mar. 9, 2006

Related U.S. Application Data

(62) Division of application No. 09/557,256, filed on Apr. 24, 2000, now Pat. No. 6,990,616.

(51) Int. Cl.
*H04L 1/00* (2006.01)
(52) U.S. Cl. ..................................................... 370/241
(58) Field of Classification Search ................. 370/230, 370/241, 252, 395.2, 389, 412; 709/224, 709/223, 231, 237, 253
See application file for complete search history.

(56) References Cited

U.S. PATENT DOCUMENTS

| | | | |
|---|---|---|---|
| 5,477,531 A | 12/1995 | McKee et al. | |
| 5,648,965 A | 7/1997 | Thadani | |
| 5,812,529 A | 9/1998 | Czarnik et al. | |
| 5,838,919 A | 11/1998 | Schwaller et al. | |
| 5,881,237 A | 3/1999 | Schwaller et al. | |
| 6,006,268 A | 12/1999 | Coile et al. | |
| 6,269,330 B1 | 7/2001 | Cidon et al. | |
| 6,327,620 B1 | 12/2001 | Tams et al. | |
| 6,360,335 B1 * | 3/2002 | Dawson ....................... | 714/39 |
| 6,438,711 B2 | 8/2002 | Woodruff | |
| 6,467,041 B1 | 10/2002 | Blam | |
| 6,622,157 B1 | 9/2003 | Heddaya et al. | |
| 6,665,726 B1 * | 12/2003 | Leighton et al. ............ | 709/231 |
| 6,665,820 B1 | 12/2003 | Frowein et al. | |
| 6,697,962 B1 | 2/2004 | McCrory et al. | |
| 6,700,891 B1 | 3/2004 | Wong | |
| 6,785,237 B1 * | 8/2004 | Sufleta ....................... | 370/236 |
| 6,845,394 B2 | 1/2005 | Ritche | |
| 6,868,094 B1 * | 3/2005 | Bordonaro et al. .......... | 370/516 |
| 6,883,118 B2 | 4/2005 | Morgan et al. | |
| 2002/0144187 A1 | 10/2002 | Morgan et al. | |
| 2003/0016627 A1 * | 1/2003 | MeLampy et al. .......... | 370/235 |
| 2005/0276252 A1 * | 12/2005 | Sizeland et al. ............. | 370/338 |

* cited by examiner

*Primary Examiner*—Hanh Nguyen
*Assistant Examiner*—Juvena Loo
(74) *Attorney, Agent, or Firm*—Darby & Darby P.C.

(57) ABSTRACT

A method for testing of a communication network, using a plurality of traffic agents coupled to communicate via the network. The method includes transmitting a sequence of data packets via the network from a first one of the traffic agents to a second one of the traffic agents and recording arrival characteristics of the packets in the sequence, responsive to receiving the packets at the second traffic agent. The arrival characteristics of different packets in the sequence are compared so as to determine a measure of variability in transmission of the packets via the network.

3 Claims, 7 Drawing Sheets

ANALYSIS OF NETWORK PERFORMANCE

FIELD OF THE INVENTION

The present invention relates generally to communication networks, and specifically to testing and fault discovery in communication networks.

BACKGROUND OF THE INVENTION

Communication networks are in wide use in many technological fields including distributed computing, data exchange and telecommunication applications. Communication networks generally include many nodes, such as bridges, LAN switches, routers, cross-connections and telephone switches. The networks further include communication links, such as cables, point-to-point radio connections and optical fibers, which connect the nodes. The networks also include ports, generally within some of the nodes, for attaching external devices such as computers, terminals, handsets, and multiplexers. These external devices are referred to as end-points, or hosts.

Networks are becoming increasingly complex, especially due to their increasing speeds of operation, the number of units interconnected by a network and the formation of large networks from different types of sub-networks. In addition, networks may transmit concurrently various types of data, such as text, voice, video and other multimedia files. In order to allow for these different types of data, some networks are designed to provide different amounts of bandwidth and different levels of quality of service.

A major issue in both newly-deployed and existing communication networks is testing and trouble-shooting, i.e., checking whether the network is operating according to its specifications and, if not, determining the cause of the network's inadequate performance (for example, the identity of a faulty unit). Dedicated point-to-point testing equipment is a commonly-used network testing tool. Such equipment is described, for example, in U.S. Pat. No. 5,477,531, whose disclosure is incorporated herein by reference. Usually, dedicated point-to-point testing equipment requires two users to coordinate their operations in order to identify a misbehaving component of the network. To test a large network, the testing equipment must be moved between many ports of the network.

U.S. Pat. No. 5,812,529, whose disclosure is incorporated herein by reference, describes a system and method for acquiring network performance data, built around a "mission server," which interfaces with clients to receive requests for "missions." A typical mission includes operations such as transmission and reception of data packets among devices connected to segments of the network. The mission is performed and/or supported by "sentries," typically software agents running on stand-alone network devices or end-points. The sentries carry out mission operations in response to commands from the mission server, and report back to the mission server on the mission results.

U.S. Pat. Nos. 5,838,919 and 5,881,237, whose disclosures are incorporated herein by reference, describe methods, systems and computer program products for testing of network performance using test scenarios that simulate actual communications traffic between network endpoints. Specific test protocols are assigned to endpoint nodes on the network. Typically, the nodes are paired, and one of the nodes in the pair communicates the protocol to the other, associated node. A console node sets up the test protocols, initiates their execution and receives data on the test performance from the endpoint nodes.

Application performance measurement tools evaluate the performance of existing or new applications as they are introduced into a network. Typical tools of this sort include "Chariot," produced by Ganymede (Research Triangle Park, N.C.), and "Webload" and "Webexam," produced by Radview (Tel Aviv, Israel). Such tools, however, do not test the network itself independent of specific applications. Therefore, they cannot readily distinguish between problems whose root causes are in the application and those that are in the network itself.

SUMMARY OF THE INVENTION

It is an object of some aspects of the present invention to provide improved methods and apparatus for locating faults within communication networks.

It is another object of some aspects of the present invention to provide improved methods and apparatus for evaluation of the performance of communication networks.

In preferred embodiments of the present invention, a distributed testing system for evaluation and/or testing of a communication network comprises a plurality of traffic agents coupled to nodes and/or hosts of the network. The traffic agents act as artificial users of the network by, for example, transmitting and receiving packets of data, establishing connections, and determining traffic statistics. The testing system further comprises a testing center, which controls the operations of the traffic agents and receives the reports from the agent regarding the results of tests conducted thereby.

In some preferred embodiments of the present invention, the testing center orders at least one of the traffic agents to transmit packets to at least one other traffic agent. The relative times and order of arrival of the packets at the receiving traffic agent or agents are preferably analyzed to find one or more measures of traffic variability. These measures are typically used to determine whether network transmissions are orderly and regular, or whether there are irregularities in packet arrival that may be indicative of network faults. While measurements of packet transmission times are used in network diagnostic systems known in the art, it is generally only the average transmission time that is of concern in these systems. Preferred embodiments of the present invention, on the other hand, make use of comparative statistical properties among the received packets to derive richer diagnostic information. For example, in one of these preferred embodiments, packets are transmitted at regular intervals, and the system compiles statistics on packets that do not reach their destination in order to determine whether packet loss occurs regularly or in bursts. In another preferred embodiment, the order of the arrival of packets at their destination is compared to the order of their transmission, and a measure is derived of the extent to which packets have arrived out of order. Other such comparative variability measures will be apparent to those skilled in the art.

In still another preferred embodiment of the present invention, the traffic agents are used to diagnose problems associated with an application running on a server and accessed over the network. A first traffic agent is installed on a first computer that is also an application server. A second traffic agent, on a second computer, both communicates with the first traffic agent and accesses the application server, by emulating a client of the server or using an actual client program on the second computer. By comparing the performance of these two types of communications, it is possible to assess whether the application service problems are due to difficulties in the application or to network communication delays. This type of comparison cannot be carried out by diagnostic systems known in the art.

In some preferred embodiments of the present invention, the testing center initiates a test by commanding a number of the traffic agents to begin transmitting packets. Typically, two or more of the traffic agents are to begin transmitting substantially simultaneously. Preferably, the command conveyed to the traffic agents includes the current time, as measured by the testing center, and a time at which the transmission is to begin. This method of test initiation obviates the need to send an initiate command to all participating nodes at the start of the test, as is practiced in diagnostic systems known in the art, and generally provides more accurate synchronization of the participating traffic agents.

In one of these preferred embodiments, a pair of traffic agents are commanded to transmit packets to one another and to determine the times of arrival of the packets that they respectively receive. The times of transmission by the two agents are generally uncorrelated. The agents then inform the testing center of the times at which they sent and received the packets, or simply of the difference between their respective send and receive times. The testing center uses these essentially one-way transmission data in order to determine accurately the round-trip travel time of a packet. By contrast, in systems known in the art, measurements of round-trip delay are based on sending a packet from a first node to a second node, and then waiting to receive a return packet from the second node. The measurements thus require consecutive actions by the two nodes and are complicated by processing delays that may occur at one or both ends.

While preferred embodiments are described herein for the most part with reference to tests involving transmission of packets between pairs of traffic agents, the principles of the present invention can also be applied in more complex test scenarios. For example, test agents may be chained, so that each one sends a packet in turn to the next agent in the chain. Alternatively or additionally, multiple agents may send packets simultaneously to the same receiving agent. All such variations are considered to be within the scope of the present invention.

There is therefore provided, in accordance with a preferred embodiment of the present invention, a method for testing of a communication network, using a plurality of traffic agents coupled to communicate via the network, the method including:

transmitting a sequence of data packets via the network from a first one of the traffic agents to a second one of the traffic agents;

creating a record of the packets in the sequence that were not received at the second traffic agent; and assessing a relative irregularity in the occurrence of packet loss, based on the record.

Preferably, assessing the relative irregularity of packet loss includes detecting bursts of lost packets.

There is also provided, in accordance with a preferred embodiment of the present invention, a method for testing of a communication network, using a plurality of traffic agents coupled to communicate via the network, the method including:

transmitting a sequence of data packets via the network from a first one of the traffic agents to a second one of the traffic agents;

determining an order of arrival of the packets at the second traffic agent; and comparing the order of arrival to an order in which the packets were transmitted.

Preferably, comparing the order of arrival includes finding a measure of discrepancy between the order of arrival and the order in which the packets were transmitted.

There is additionally provided, in accordance with a preferred embodiment of the present invention, a method for testing of a communication network, using a plurality of traffic agents coupled to communicate via the network, the method including:

transmitting a sequence of data packets via the network from a first one of the traffic agents to a second one of the traffic agents;

determining respective arrival times of the packets in the sequence;

determining a packet transmission delay between the traffic agents responsive to the arrival times; and finding a change in the transmission delay over time.

There is further provided, in accordance with a preferred embodiment of the present invention, a method for testing of a communication network, using a plurality of traffic agents coupled to communicate via the network, the method including:

transmitting a sequence of data packets via the network from a first one of the traffic agents to a second one of the traffic agents, the sequence including both communication test packets and packets associated with an application that is accessed via the network;

recording arrival characteristics of the packets in the sequence, responsive to receiving the packets at the second traffic agent; and observing a difference in the arrival characteristics of the communication test packets relative to those of the packets associated with the application.

There is moreover provided, in accordance with a preferred embodiment of the present invention, a method for testing of a communication network, using a plurality of traffic agents coupled to communicate via the network, the method including:

transmitting a first sequence of data packets via the network from a first one of the traffic agents to a second one of the traffic agents;

transmitting a second sequence of data packets via the network from the second one of the traffic agents, responsive to receiving the data packets in the first sequence, to a third one of the traffic agents;

recording arrival characteristics of the packets in the second sequence, responsive to receiving the packets at the third traffic agent; and comparing the arrival characteristics of different packets in the sequence so as to determine a measure of variability in transmission of the packets via the network.

There is furthermore provided, in accordance with a preferred embodiment of the present invention, a method for testing of a computer application accessed via a communication network, using a plurality of traffic agents coupled to communicate via the network, the method including:

running an instance of the application on a first computer coupled to the network, on which a first one of the traffic agents is also running;

exchanging test data packets via the network between a second one of the traffic agents, running on a second computer coupled to the network, and the first traffic agent, so as to determine test packet exchange characteristics generally independent of the application;

exchanging application data packets via the network between the second computer and the instance of the application running on the first computer, so as to determine application packet exchange characteristics; and comparing the exchange characteristics of the application and test packets.

Preferably, running the instance of the application on the first computer includes running an application server, and exchanging the application data packets includes transmitting application client messages from the second computer to the first computer. Alternatively or additionally, running the instance of the application includes running a distributed computing application on the first computer, and exchanging the application data packets includes running another instance of the application on the second computer. Further alternatively or additionally, comparing the exchange characteristics includes comparing a delay in the exchange of application data between the first and second computers relative to the exchange of test data.

There is also provided, in accordance with a preferred embodiment of the present invention, a method for determining a round-trip transmission delay in a communication network, including:

transmitting a first data packet through the network at a first transmit time, from a first endpoint of the network to a second endpoint of the network;

receiving the first data packet at the second endpoint at a first receive time;

transmitting a second data packet through the network at a second transmit time, substantially independent of the first transmit and receive times, from the second endpoint to the first endpoint;

receiving the second data packet at the first endpoint at a second receive time; and comparing the first and second transmit times and the first and second receive times so as to determine the round-trip transmission delay.

Preferably, transmitting the second data packet includes transmitting the second packet without waiting to receive the first data packet at the second endpoint. Additionally or alternatively, comparing the first and second transmit times and the first and second receive times includes using transmit and receive times recorded in accordance with different clocks maintained at the first and second endpoints. Most preferably, comparing the first and second transmit times and the first and second receive times includes canceling out a relative offset between the different clocks, substantially without an a priori knowledge of the offset.

There is additionally provided, in accordance with a preferred embodiment of the present invention, a method for testing of a communication network, using a plurality of traffic agents coupled to communicate via the network and having respective agent clocks that are generally independent of one another, the method including:

determining at a testing center a start time at which a test of the network is to begin;

sending respective start messages to the traffic agents, each start message containing the start time and a time of sending the start message determined with reference to a local clock maintained by the testing center; and synchronizing initiation of the test by the traffic agents, responsive to the respective start messages.

Preferably, determining the start time includes choosing a time to start the test that is delayed relative to expected times of sending the start messages. Further preferably, synchronizing the initiation of the test includes starting the test at each of the traffic agents at the start time, as indicated by the respective agent clock, corrected responsive to the time of sending contained in the respective start message.

There is further provided, in accordance with a preferred embodiment of the present invention, apparatus for testing of a communication network, including:

a first traffic agent, coupled to transmit a sequence of data packets via the network; and a second traffic agent, coupled to receive the data packets transmitted by the first traffic agent and to record, responsive to receiving the data packets, an indication of the packets in the sequence that were lost in transmission, wherein a relative irregularity in the occurrence of packet loss is assessed based on the indication.

Preferably, the apparatus includes a testing center, coupled to the network, which is adapted to receive the indication of the packets that were lost in transmission and to assess the relative irregularity in the occurrence of packet loss.

There is moreover provided, in accordance with a preferred embodiment of the present invention, apparatus for testing of a communication network, including:

a first traffic agent, coupled to transmit a sequence of data packets via the network; and a second traffic agent, coupled to receive the data packets transmitted by the first traffic agent and to record, responsive to receiving the data packets, an order of arrival of the packets at the second traffic agent, wherein a measure of discrepancy is determined between the order of arrival and an order in which the packets were transmitted.

There is furthermore provided, in accordance with a preferred embodiment of the present invention, apparatus for testing of a communication network, including:

a first traffic agent, coupled to transmit a sequence of data packets via the network; and a second traffic agent, coupled to receive the data packets transmitted by the first traffic agent and to record, responsive to receiving the data packets, respective arrival times of the packets in the sequence at the second traffic agent, wherein a change in a transmission delay over time between the first and second traffic agents is detected responsive to the recorded arrival times.

There is also provided, in accordance with a preferred embodiment of the present invention, apparatus for testing of a computer application accessed via a communication network, including:

a first computer, coupled to communicate via the network, and configured both to run an instance of the application and to act as a first traffic agent; and a second computer, coupled to communicate via the network with the first computer, and configured both to act as a second traffic agent so as to exchange test data packets via the network with the first traffic agent, generally independent of the application, and to exchange application data packets via the network with the instance of the application running on the first computer, so as to determine and compare characteristics of the exchange of the test data with corresponding characteristics of the exchange of the application data.

Preferably, the instance of the application running on the first computer includes an application server, and wherein the second computer acts as a client of the application.

There is additionally provided, in accordance with a preferred embodiment of the present invention, apparatus for determining a round-trip transmission delay in a communication network, including:

a first traffic agent, adapted to be coupled to a first network endpoint and configured to transmit a first data packet through the network at a first transmit time, from the first endpoint to a second endpoint of the network; and a second traffic agent, adapted to be coupled to the second network endpoint, so as to receive the first data packet at a first receive time and to transmit a second data packet through the network to the first network endpoint at a second transmit time, substantially independent of the first transmit and receive times, to be received by the first traffic agent at a second receive time, wherein the first and second transmit times and the first and second receive times are compared so as to determine the round-trip transmission delay.

There is further provided, in accordance with a preferred embodiment of the present invention, apparatus for testing of a communication network, including:

a plurality of traffic agents, coupled to communicate via the network and having respective agent clocks that are generally independent of one another; and a testing center, having a local clock and adapted to determine a start time at which a test of the network is to begin, and to send respective start messages to the traffic agents, each start message containing the start time and a time of sending the start message determined with reference to the local clock, so that the traffic agents synchronize initiation of the test responsive to the respective start messages.

There is moreover provided, in accordance with a preferred embodiment of the present invention, apparatus for testing of a communication network, including:

a first traffic agent, coupled to transmit a first sequence of data packets via the network;

a second traffic agent, coupled to receive the data packets transmitted by the first traffic agent and to transmit, responsive to receiving the data packets in the first sequence, a second sequence of data packets via the network to a third traffic agent; and a third traffic agent, coupled to receive the data packets transmitted by the second traffic agent and to record, responsive to receiving the data packets, arrival characteristics of the packets in the second sequence, wherein the arrival characteristics of different packets are compared so as to determine a measure of variability in transmission of the packets via the network.

There is furthermore provided, in accordance with a preferred embodiment of the present invention, a computer software product for testing of a communication network, the product including a computer-readable medium containing program instructions, which instructions, when executed by first and second computers coupled to communicate via the network, cause the first computer to transmit a sequence of data packets via the network to the second computer, and further cause the second computer to receive the data packets and to record arrival characteristics of the received packets, wherein the arrival characteristics of different packets in the sequence are compared so as to determine a measure of variability in transmission of the packets via the network, wherein the measure of variability is a measure relating to a quality selected from a group of qualities consisting of changes in packet transmission delay, loss of transmitted packets and an order in which transmitted packets are received.

In a preferred embodiment, the program instructions, when executed by a third computer, cause the third computer to act as a testing center, which receives the arrival characteristics from the first and second computers and determines the measure of variability.

There is furthermore provided, in accordance with a preferred embodiment of the present invention, a computer software product for testing of a computer application accessed via a communication network, the product including a computer-readable medium containing program instructions, which instructions, when executed by first and second computers coupled to communicate via the network, wherein the first computer is also running an instance of the application, cause the first and second computers to exchange test data packets via the network, generally independent of the application, so as to determine test packet exchange characteristics, and to exchange application data packets via the network between the second computer and the instance of the application running on the first computer, so as to determine application packet exchange characteristics, whereby the exchange characteristics of the application and test packets are compared.

There is additionally provided, in accordance with a preferred embodiment of the present invention, a computer software product for determining a round-trip transmission delay in a communication network, the product including a computer-readable medium containing program instructions, which instructions, when executed by first and second computers coupled to communicate via the network, cause the first computer to transmit a first data packet through the network to the second computer at a first transmit time, and cause the second computer to receive the first data packet at a first receive time and to transmit a second data packet through the network to the first computer at a second transmit time, substantially independent of the first transmit and receive times, which second data packet is received by the first computer at a second receive time, wherein the first and second transmit times and the first and second receive times are compared so as to determine the round-trip transmission delay.

There is also provided, in accordance with a preferred embodiment of the present invention, a computer software product for testing of a communication network, the product including a computer-readable medium containing program instructions, which instructions, when executed by a plurality of computers coupled to communicate via the network and having respective local clocks that are generally independent of one another, cause a first one of the computers to determine a start time at which a test of the network is to begin and to send respective start messages to the other computers, each start message containing the start time and a time of sending the start message determined with reference to the local clock maintained by the first computer, and which instructions further cause the other computers to synchronize initiation of the test, responsive to the respective start messages.

The present invention will be more fully understood from the following detailed description of the preferred embodiments thereof, taken together with the drawings in which:

DETAILED DESCRIPTION OF PREFERRED EMBODIMENTS

Figure 1:
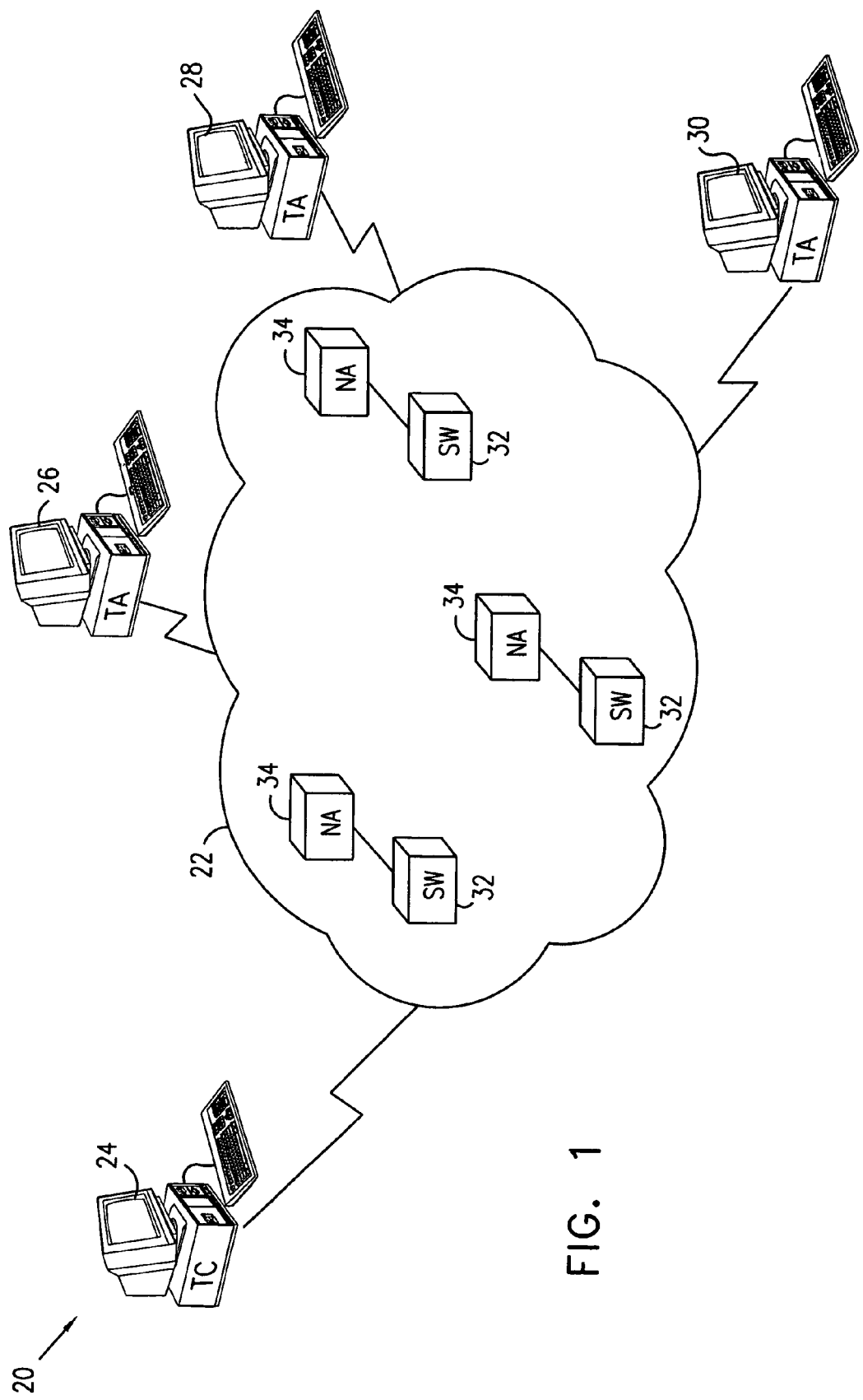
FIG. 1 is a block diagram that schematically illustrates a distributed network testing system, in accordance with a preferred embodiment of the present invention.

FIG. 1 is a block diagram that schematically illustrates a distributed testing system 20, used to perform diagnostic testing on a network 22, in accordance with a preferred embodiment of the present invention. Network 22 may comprise substantially any network known in the art that is capable of transmitting data packets, such as a local- or wide-area network (LAN or WAN), a public switched telephone network (PSTN), the Internet or an intranet, an asynchronous transfer mode (ATM) network, an optical or wireless network, or some combination of these different types. The network comprises switching hardware, represented schematically in FIG. 1 as switches 32.

Testing system 20 comprises a plurality of end-point traffic agents 26, 28, 30, which are coupled to ports of network 22. Preferably, the traffic agents serve as both traffic generators, transmitting packets through the network, and as traffic analyzers, receiving packets and assembling information regarding the received packets, as described in detail hereinbelow. Traffic agents 26, 28, 30 are typically implemented as software processes running on host computers connected to the network. Alternatively, when network 22 is a very fast network, such as an ATM or a Gigabit Ethernet network, some or all of the hosts may comprise add-on hardware devices to accommodate the needs of the traffic agents. Further alternatively or additionally, the traffic agents may be implemented as stand-alone devices, independent of host computers.

Preferably, testing system 20 also comprises one or more network management agents 34, which are associated with one or more of switches 32. These and other aspects of the testing system are described in U.S. patent application Ser. No. 09/164,488, which is assigned to the assignee of the present patent application, and whose disclosure is incorporated herein by reference.

System 20 further includes a testing center 24, which is preferably implemented as a software process executed at a network management host. The host of testing center 24 preferably comprises a graphical workstation or a personal computer. The software for the testing center, as well as software for carrying out the functions of the traffic agents, is typically conveyed to the respective computers via network 22. Alternatively, the software may be supplied on tangible media, such as CD-ROM, for installation on the respective computers. Preferably, testing center 24 communicates through network 22 with traffic agents 26, 28, 30, as well as with network management agents 34. Alternatively or additionally, different communication apparatus, independent of network 22, such as modem dialup lines or Internet connections, are used to communicate with some or all of the traffic agents.

Testing center 24 preferably conducts tests by transmitting one or more commands to at least some of the traffic agents and network management agents, and subsequently receiving reports from the agents. Preferably, testing center 24 processes the reports, evaluates network 22 based on the reports and displays test results to a network operator. The tests may be initiated by the operator, or they may be carried out automatically by the test center on a predetermined schedule or when a fault condition is suspected. When the tests are carried out automatically, and a fault condition is detected, the testing center preferably generates an alarm, so as to notify the operator that a fault has occurred.

Figure 2:
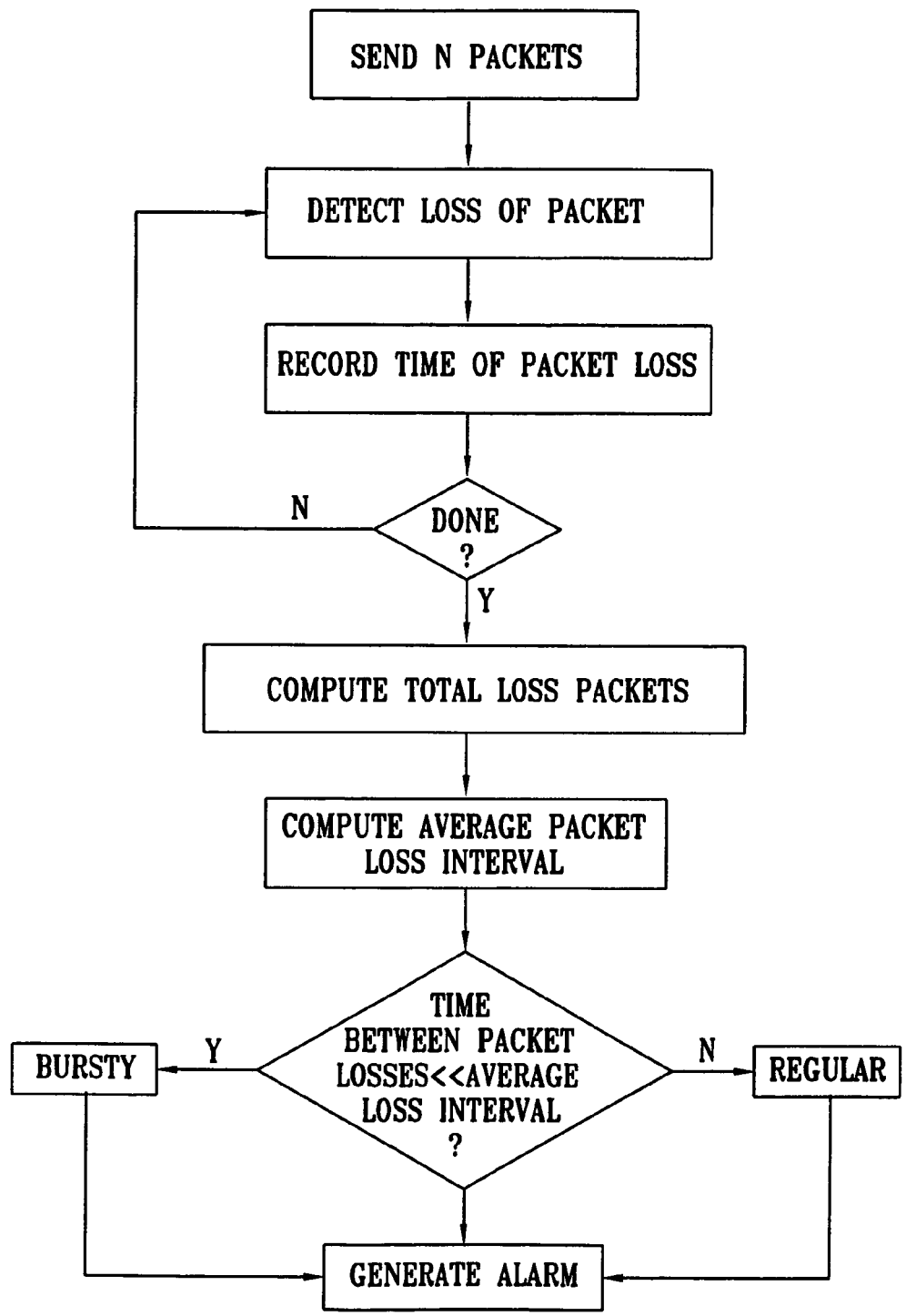
FIG. 2 is a flow chart that schematically illustrates a method for network testing, in accordance with a preferred embodiment of the present invention.

FIG. 2 is a flow chart that schematically illustrates a method for testing network 22 using system 20, in accordance with a preferred embodiment of the present invention. This method tests loss of packets in transmission through the network, and particularly the regularity or "burstiness" of such loss. Testing center 24 commands one of the traffic agents, such as agent 26, to transmit a sequence of a predetermined number of packets, say N packets, to another traffic agent, such as agent 28. Multiple transmitting and/or receiving traffic agents may likewise be employed in this method and in other test methods described hereinbelow. Each packet carries an index identifying its position in the sequence, and the packets are preferably transmitted at roughly uniform intervals. Thus, when agent 28 receives the packets, its is able to determine, based on the sequence indices, which of the packets have not arrived. Agent 28 thus records the times of arrival of the packets and, particularly, the numbers of any lost packets, typically including packets corrupted in transit.

Once all of the N packets have been sent, agent 28 tabulates the results of the test, including the total number of lost packets and their indices, and conveys this information to testing center 24 for processing. The testing center computes an overall loss ratio, p, equal to the number of lost packets divided by the total number of packets sent, N. If the average interval between transmission of successive packets in the sequence is T, then the average time between successive lost packets will be T/p.

The testing center checks a histogram of the difference in the indices of the lost packets, indicating the actual time between packets that were lost, against this average. If the histogram is substantially peaked at short intervals, the packet loss is considered to be "bursty." (In other words, most of the lost packets are in closely-spaced groups, separated by times much longer than T/p between successive groups.) In normal operation of a large network, particularly a datagram network, such as an Internet Protocol (IP) network, such bursty loss is to be expected from time to time as a result of network congestion. On the other hand, if the histogram is generally grouped around the average time T/p, then the packet loss is considered to be roughly regular, or "non-bursty." In this case, the packet loss is probably not due to congestion, but rather to random noise that may be the result of a hardware fault, such as a loose connection or bad interface.

Thus, at the conclusion of the test, testing center 24 generates a report indicating the number of lost packets and the relative "burstiness," or variability, of the loss. Based on the histogram analysis described above, and/or on other statistical analyses, as are known in the art, the testing center indicates the probably cause of the packet loss. When the loss of packets exceeds some threshold (which may also depend on the relative burstiness of the loss), the testing center preferably generates an alarm to notify the operator of a possible fault situation.

Figure 3:
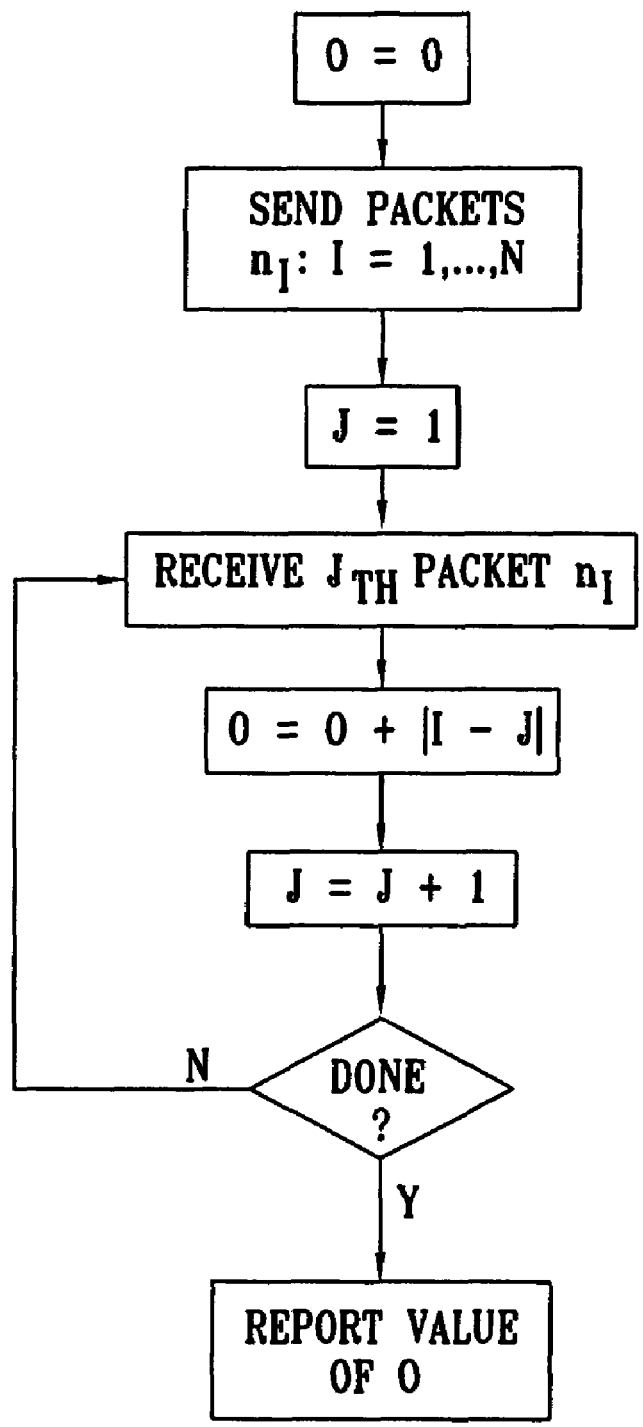
FIG. 3 is a flow chart that schematically illustrates another method for network testing, in accordance with a preferred embodiment of the present invention.

FIG. 3 is a flow chart that schematically illustrates another method for testing network 22, in accordance with a preferred embodiment of the present invention. In this method, as in the method of FIG. 2, agent 26 is commanded to send an ordered sequence of N packets, each packet containing a running index I. As agent 28 receives the packets, it assigns each packet its own index J, corresponding to the order in which the packets were received. Preferably, agent 28 then computes an order score M given by the total deviation between the sending index I and the receiving index J over all of the received packets, for example:

$$M = \sum_{1}^{N} |I - J|$$

This formula may be modified to take other factors into account, such as lost packets. Other, more complex measures of the variability in packet arrival order can similarly be derived.

At the conclusion of the test, the testing center analyzes and reports to the network operator on the deviation of the packets from ordered arrival. If all of the packets arrived in order, M will have the value zero. If the order of the arriving packets was severely disturbed, M will be large. It may then be concluded that there is a fault or disruption in the network, such as a routing problem or rapidly occurring changes in network link quality. Preferably, when M (or some other, comparable variability measure) exceeds a given threshold, the testing center generates an alarm for the attention of the network operator.

Figure 4:
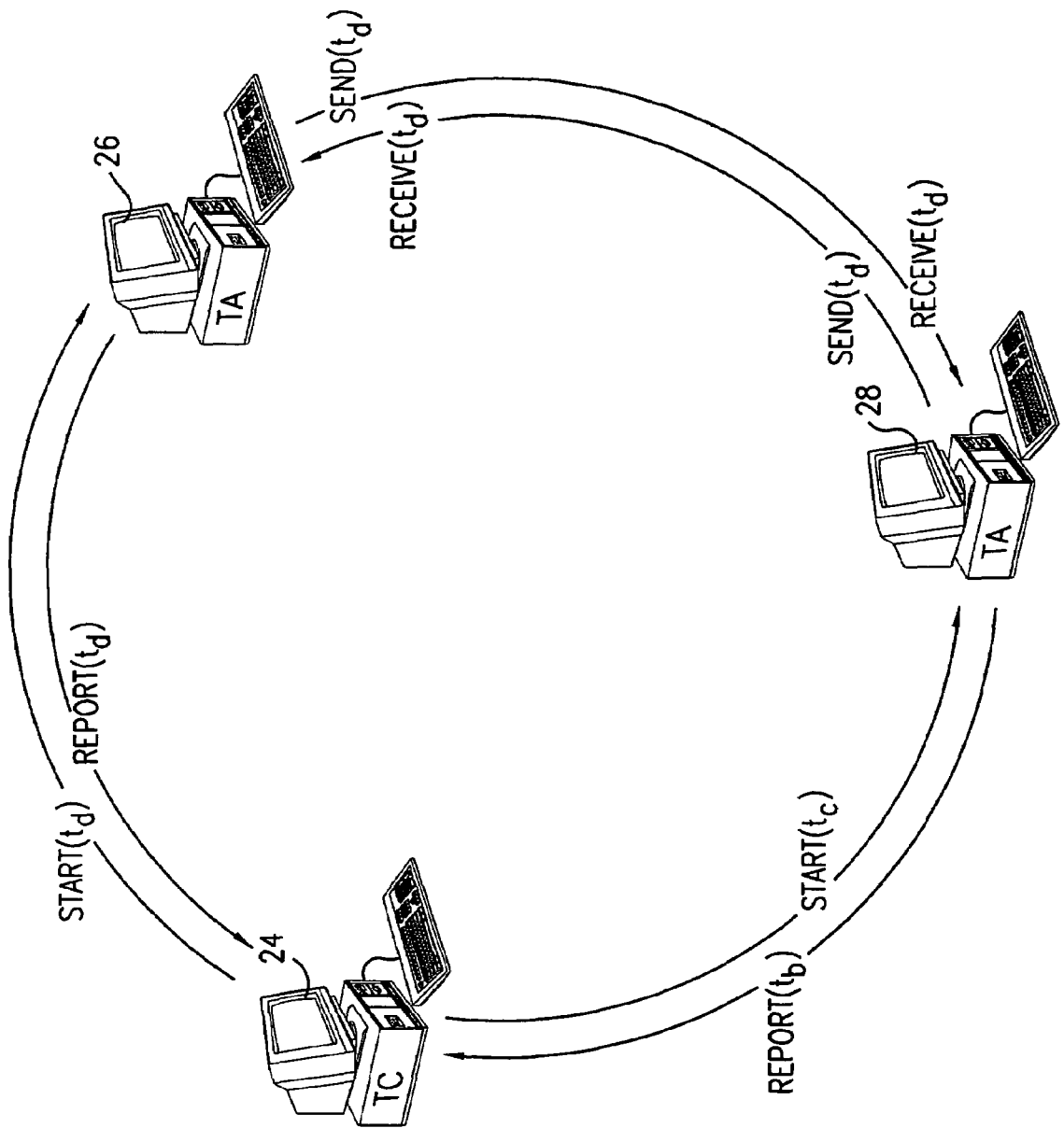
FIG. 4 is a block diagram that schematically illustrates message flow among elements of the system of FIG. 1, in accordance with a preferred embodiment of the present invention.

FIG. 4 is a block diagram that schematically illustrates message flow among elements of system 20 associated with yet another method for testing network 22, in accordance with a preferred embodiment of the present invention. In this method, a round-trip packet transmission time is estimated accurately between two network endpoints, such as agents 26 and 28, using uncorrelated one-way transmissions between the agents. To understand how this estimate is made, let t be a clock time maintained by the testing center, while t' is the clock value maintained by agent 26 and t" is the clock value maintained by agent 28. Typically, the clocks are not precisely synchronized, so that t'=t+$M_1$, and t"=t+$M_2$. Here the values of the clock offsets $M_1$ and $M_2$ are unknown, but they can be assumed to be very nearly constant over short periods of time.

To begin the measurement, testing center 24 sends a command to agent 26 to transmit a packet to agent 28 at an assigned time, $t_a$. Agent 26 receives the command, and transmits the package at time $t_a$', i.e., at the time assigned by the testing center, but measured using the local clock of the agent. Agent 28 receives the packet, and records its arrival at a time $t_b$?. Meanwhile, testing center 24 sends a command to agent 28 to transmit a packet to agent 26 at a time $t_c$, which is preferably close to the expected value of $t_b$ (although at the time that it sends the command to agent 28, the testing center has no knowledge of the actual value of $t_b$). This packet is transmitted at a time $t_c$? and is recorded as having reached agent 26 at a time $t_d$'. Agents 26 and 28 then preferably compute the values of ($t_a$'-$t_d$') and of ($t_b$?-$t_c$?), respectively, and report these values to the testing center. Alternatively, the raw values of $t_a$', $t_d$', $t_b$? and $t_c$" are reported. Typically, this process is repeated a number of times.

Testing center uses the values of ($t_a$'-$t_d$') and ($t_b$?-$t_c$?) as follows to calculate the estimate of the round-trip transmission time between agents 26 and 28:

$$Delay_{RT} \cong (t'_a - t'_d) - (t_b? - t_c?)$$
$$= [(t'_a + M_1) - (t_d + M_1)] - [(t_b + M_2) - (t_c + M_2)]$$
$$= (t_a - t_b) + (t_c - t_d)$$

In other words, the relative clock offsets cancel out, and the testing center is left with an accurate measurement, in its own time frame, of the packet transit times from agent 26 to agent 28 and from agent 28 to agent 26.

A similar approach can be used to monitor variability in one-way transmission delays through network 22. In this case, successive values of $t_a$' and $t_b$? are measured with respect to transmission of packets from agent 26 to agent 28. Although the exact transmission time ($t_a$-$t_b$) is not measured, due to the different clock offsets of the two agents, testing center 24 can measure changes in the relative value of ($t_a$'-$t_b$?) in order to monitor trends toward greater or lesser transmission delays.

Figure 5:
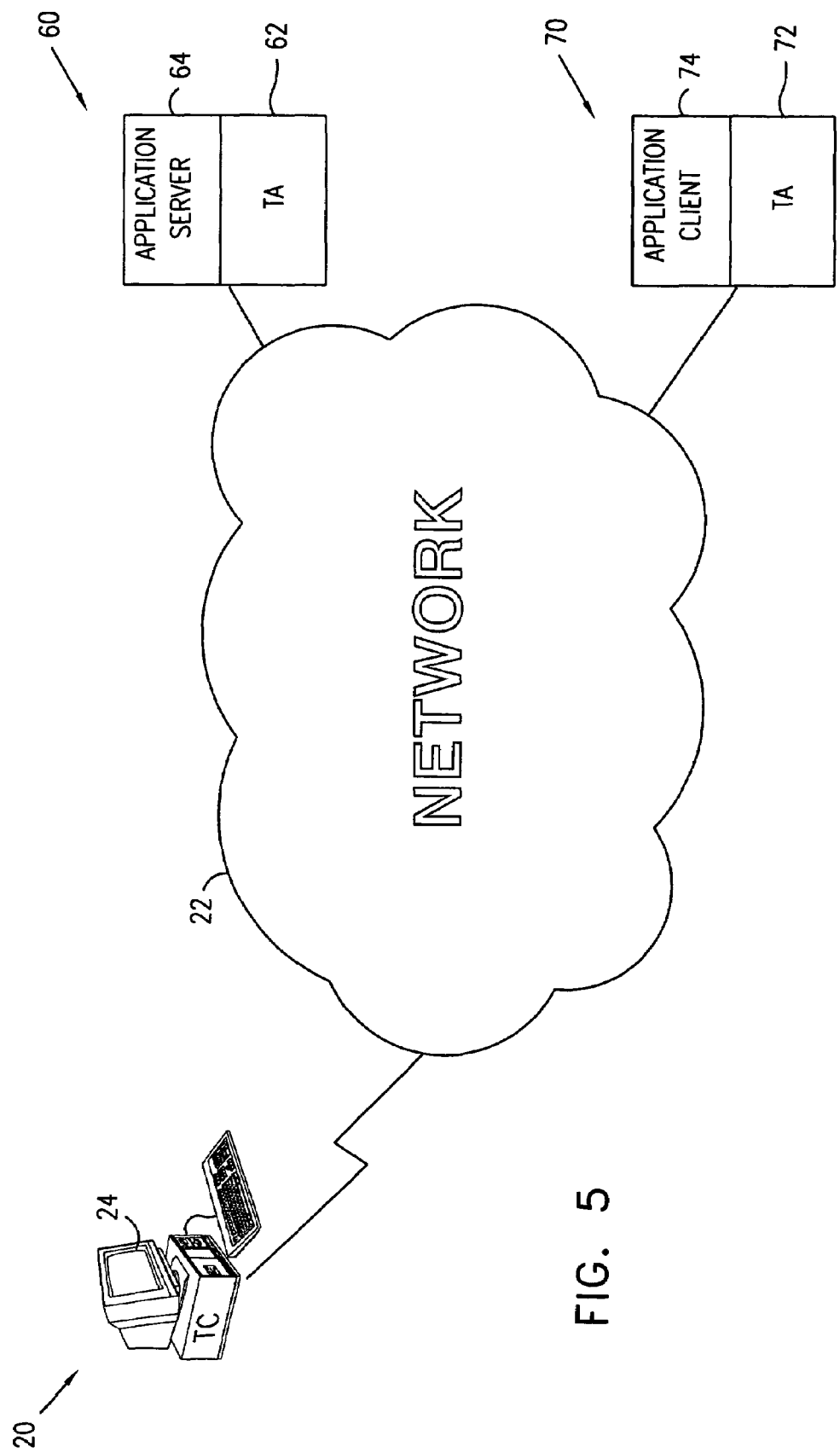
FIG. 5 is a block diagram showing elements of a distributed network testing system, which schematically illustrates still another method for network testing, in accordance with a preferred embodiment of the present invention.

FIG. 5 is a block diagram that schematically illustrates elements of system 20, useful in understanding yet another method for testing of network 22, in accordance with a preferred embodiment of the present invention. This method is used to diagnose faults and other service complaints associated with an application that runs on a server and is accessed by clients via the network. A similar method can be used for diagnosing problems encountered in distributed computing applications.

For the purposes of this method, traffic agents 62 and 72 run respectively on computer hosts 60 and 70, which communicate via network 22. An application server 64 is installed on host 60. Agent 72, under the command of testing center 24, exchanges test traffic with agent 62, independently of the application. At the same time, agent 72 is configured to emulate a client 74 of application server 64, so as to exchange application traffic with the application server. (Alternatively, the agent may work in cooperation with an actual client.) The two types of traffic that are exchanged are evaluated to assess their relative performance, typically in terms of qualities such as packet throughput, delay, loss, jitter and other measures described herein or otherwise known in the art. If there are significant performance variations between the two types of traffic, it is a likely indication that difficulties being encountered by users of the application are attributable to application or server problems. On the other hand, to the extent that similar results are obtained for both types of traffic, the application difficulties are probably attributable to network problems. In this case, the test can be repeated using another traffic agent, preferably one that is relatively close to host 60, in order to determine whether the situation improves when the communication path through the network is shortened or otherwise altered.

Another option is for testing center 24 first to test communications between agent 72 and application server 64. While doing so, the testing center receives and analyzes the traffic generated by the application, in order to derive information such as the length of the data received by agent 72, or even the full contents of communication transactions. Then, during a second stage, the testing center generates parameters to be used in a test conducted between agents 62 and 72, so that the test traffic exchanged in the second stage will be as similar as possible to the actual application traffic in the first stage.

Figure 6:
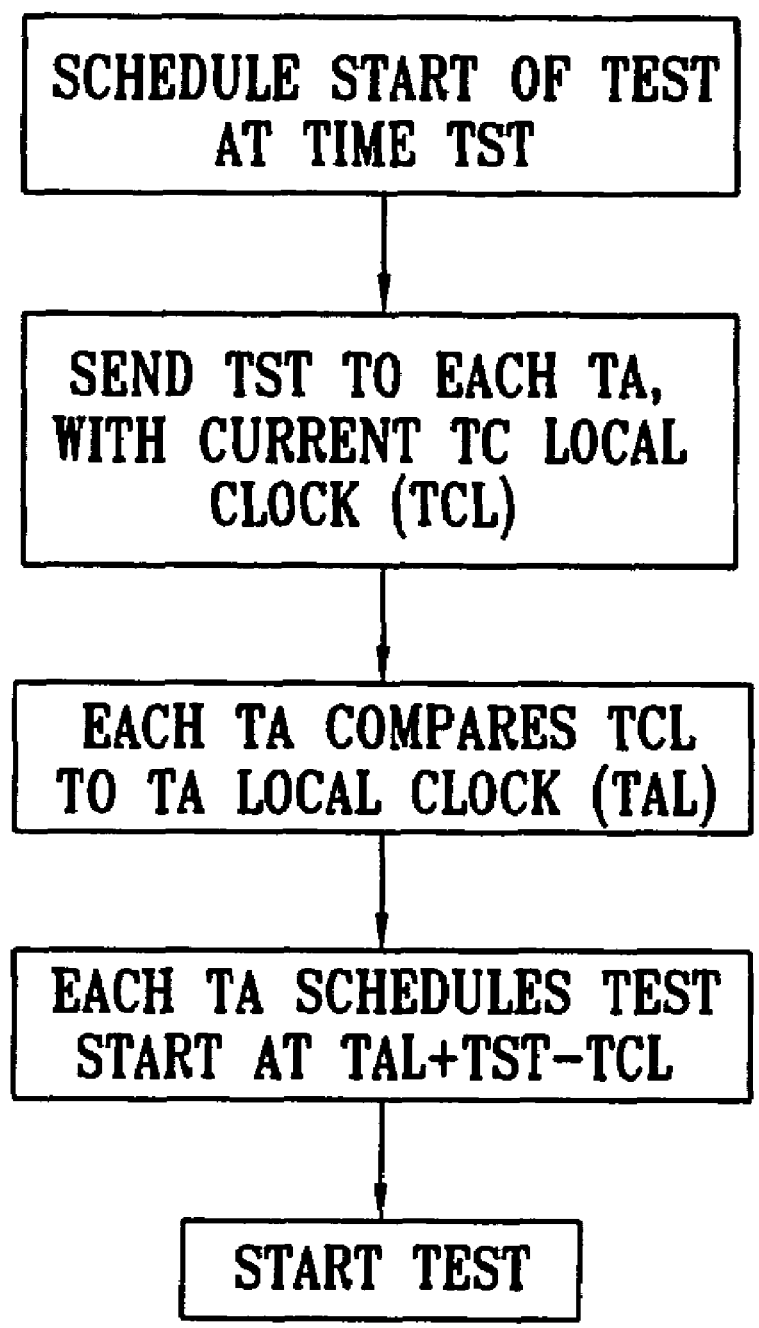
FIG. 6 is a flow chart that schematically illustrates yet another method for network testing, in accordance with a preferred embodiment of the present invention.

FIG. 6 is a flow chart that schematically illustrates a method for synchronizing the initialization of testing performed by multiple traffic agents, in accordance with a preferred embodiment of the present invention. This synchronization comes to compensate, at least in part, for the relative offsets of the clocks maintained by different traffic agents, as mentioned hereinabove with reference to the embodiment of FIG. 4. Furthermore, when a large number of traffic agents (and possibly network management agents 34, as well) participate in a given test scenario and are required to begin testing simultaneously, the present method generally provides more accurate synchronization than methods known in the art, which rely on sending a "start" command to all of the test participants at the same time.

Testing center 24 determines a time, TST, at which a given diagnostic test is to begin. Preferably, TST is set sufficiently far in advance so that the testing center is assured of having time to communicate with all of the test participants so as to complete the following synchronization procedure before time TST arrives. TST is determined in accordance with a local clock, TCL, maintained by the testing center. The agents participating in the test, however, maintain their own clocks, which typically differ from TCL. Therefore, to compensate for this difference, the test center sends an initialization message to each of the participating agents that includes both the value of TST and a value of time TCL sampled at the time that the respective initialization message is sent. Preferably, sampling of TCL is delayed after preparation of the initialization message so as that the sampling takes place as close as possible to the actual transmission of the message.

When a given agent receives its respective initialization message, it compares the sampled value TCL to its own local clock TAL. The agent then sets its own schedule to begin the test at a time given by TAL+TST−TCL. In this manner, the offsets between the different clocks in system 20 are zeroed out, and all of the agents begin the test at roughly the same. Although there may still be a residual discrepancy in the start times of the agents, due to the different transit times of the respective initialization messages, this discrepancy is still substantially smaller than the discrepancy that occurs when the testing center must simultaneously send a "start" message to each participant in a long sequence.

Figure 7A:
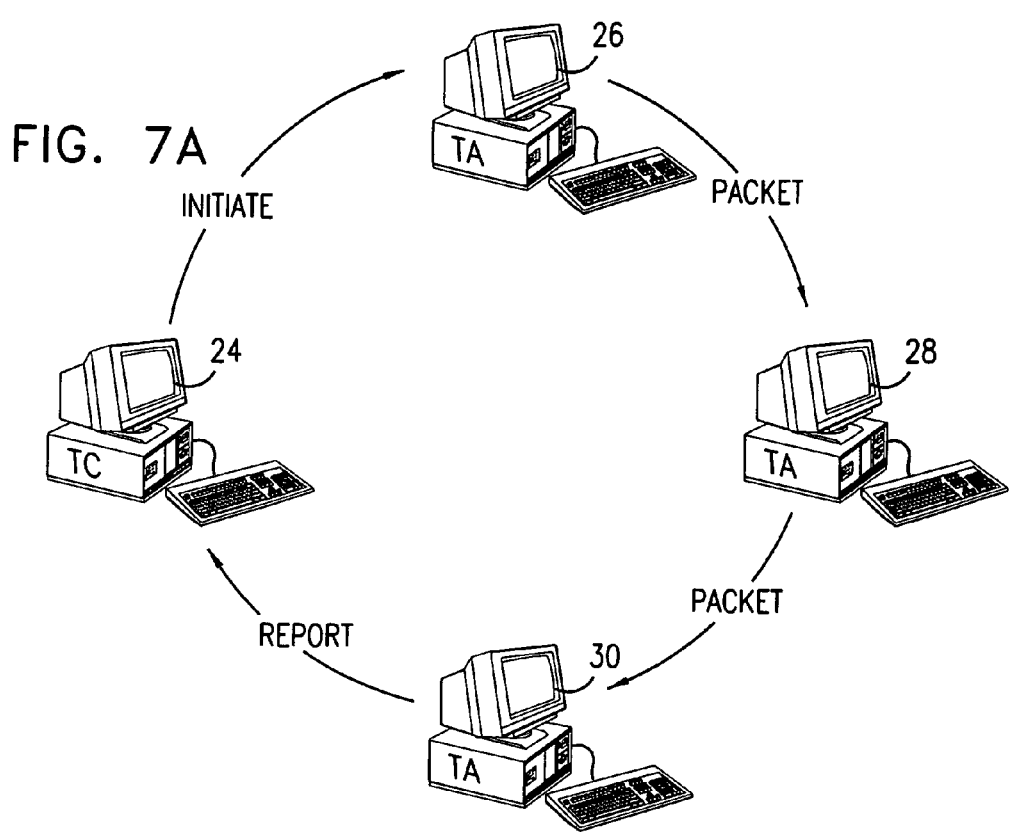
FIGS. 7A and 7B are block diagrams that schematically illustrates message flow among elements of the system of FIG. 1, in accordance with preferred embodiments of the present invention.
Figure 7B:
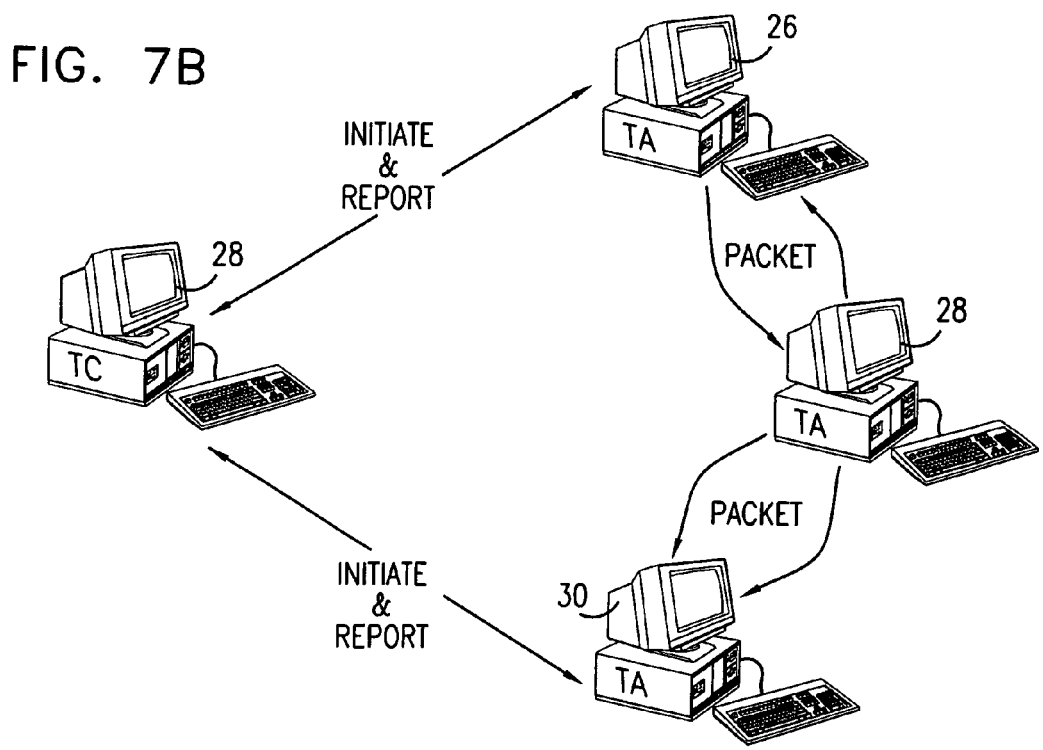

FIGS. 7A and 7B are block diagrams that schematically illustrate other testing configurations that can be implemented in system 20, in accordance with preferred embodiments of the present invention. Although some preferred embodiments are described hereinabove with reference to pairs of participating traffic agents, other, more complex test configurations can also be used in these tests. Thurs, for example, FIG. 7A, testing center 24 instructs traffic agent 26 to send a packet to traffic agent 28, which responds by sending another packet on to traffic agent 30. In FIG. 7B, both of agents 26 and 30 exchange packets with agent 28, preferably substantially simultaneously. Measures of packet arrival variability and transmission delay, such as those described hereinabove, may similarly be made in these more complex configurations. The network management agents may also be involved in such measurements.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for testing of a communication network, comprising:
providing a first traffic agent having a first traffic agent clock;
providing of a local clock by a testing center;
specifying a test start time at which the testing is to begin;
sending a start message to the first traffic agent, the start message containing the test start time and a time of sending the start message according to the local clock;
receiving, by the first traffic agent, the start message;
measuring, by the first traffic agent, a time of the receiving according to the first traffic agent clock;
scheduling, by the first traffic agent, a start of the testing to be the test start time plus the time of receiving of the start message according to the first traffic agent clock minus the time of sending the start message according to the local clock;
starting the testing, by the first traffic agent, according to the scheduling;
transmitting a first sequence of data packets via the network from the first traffic agent to a second traffic agents;
transmitting a second sequence of data packets via the network from the second traffic agents, responsive to receiving the data packets in the first sequence, to a third traffic agent having a third traffic agent clock;
recording arrival times of the packets in the second sequence according to the third traffic agent clock, responsive to receiving the data packets at the third traffic agent; and
comparing the arrival times of different packets so as to determine a measure of variability in transmission of the packets via the network.

2. Apparatus for testing of a communication network, comprising:
a test center having a local clock, and coupled to transmit a start message containing a test start time and a time of sending the start message according to the local clock;
a first traffic agent having a first traffic agent clock, and coupled to receive the start message, and to transmit a first sequence of data packets via the network at the test start time plus a time of receiving the start message according to the first traffic agent clock minus the time of sending the start message according to the local clock; and
a second traffic agent having a second traffic agent clock, and coupled to receive the start message, to receive the data packets transmitted by the first traffic agent, to measure an arrival time of the data packets according to the second traffic agent clock, offset by a time of receiving the start message according to the second traffic agent clock minus the time of sending the start message according to the local clock, and to transmit, responsive to measuring the arrival time of the data packets, the arrival times for comparison to determine a measure of variability in transmission of the packets via the network.

3. A computer software product for testing of a communication network, the product comprising a computer-readable medium containing program instructions, which instructions, when executed by first, second, and third computers coupled to communicate via the network,
cause the first computer to:
act as a testing center, which receives arrival times from the second and third computers, to send a message containing a start test time and a time of sending the message according to a local clock in the first computer, and to determine a measure of variability in the transmission of data packets via the network;
cause the second computer to:
receive the message from the first computer, and to transmit a sequence of data packets via the network to the third computer at the start time plus a time of receiving the start message according to a second computer clock minus the time of sending the start message according to the local clocks; and further to
cause the third computer to:
receive the data packets and to record arrival times of the received packets according to a third computer clock offset by a time of receiving the start message according to the second computer clock minus the time of sending the start message according to the local clock, wherein the arrival times of different packets in the sequence are compared so as to determine a measure of variability in transmission of the packets via the network.

* * * * *